United States Patent
Kramer

(10) Patent No.: US 7,474,211 B2
(45) Date of Patent: Jan. 6, 2009

(54) SYSTEM AND METHOD FOR KILLING A RFID TAG

(76) Inventor: Bradley Allen Kramer, 9000 Vantage Point Dr., Dallas, TX (US) 75243

(*) Notice: Subject to any disclaimer, the term of this patent is extended or adjusted under 35 U.S.C. 154(b) by 209 days.

(21) Appl. No.: 11/062,724

(22) Filed: Feb. 22, 2005

(65) Prior Publication Data

US 2006/0187046 A1 Aug. 24, 2006

(51) Int. Cl.
G08B 13/14 (2006.01)
(52) U.S. Cl. .................. 340/572.1; 340/568.1; 342/42
(58) Field of Classification Search ... 340/572.1–572.8, 340/568.1, 10.1; 342/42
See application file for complete search history.

(56) References Cited

U.S. PATENT DOCUMENTS

| | | | | |
|---|---|---|---|---|
| 4,728,938 A | * | 3/1988 | Kaltner | 340/572.3 |
| 5,103,210 A | * | 4/1992 | Rode et al. | 340/572.3 |
| 6,549,119 B1 | * | 4/2003 | Turner | 340/10.5 |
| 7,075,436 B2 | * | 7/2006 | Shanks et al. | 340/572.1 |
| 2004/0263319 A1 | * | 12/2004 | Huomo | 340/10.2 |

* cited by examiner

*Primary Examiner*—Phung Nguyen

(57) ABSTRACT

System and method for disabling a RFID tag. A preferred embodiment comprises attenuating a signal received at an antenna of the RFID tag based upon a status of the RFID tag and responding to an instruction in the received signal if the attenuated signal is detectable. The attenuation of the received signal requires that the received signal have a signal strength greater than a specified threshold in order for the instruction in the received signal to be detectable. This means that for a given signal transmit power, the RFID tag must be within a certain distance from a RFID reader attempting to retrieve information from the RFID tag. By setting the attenuation amount at a sufficiently high level, the method ensures that the RFID reader must be substantially adjacent to the RFID tag, preventing the unintended retrieval of unique identification information by RFID readers remotely located from the RFID tag.

19 Claims, 3 Drawing Sheets

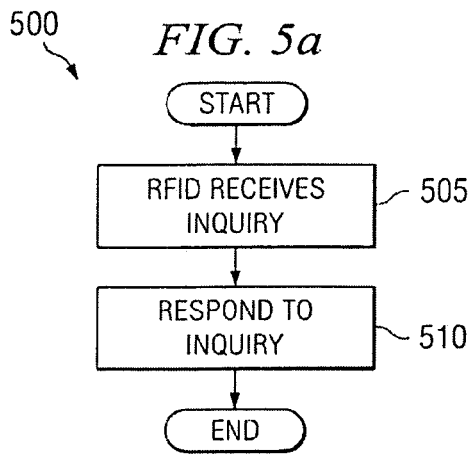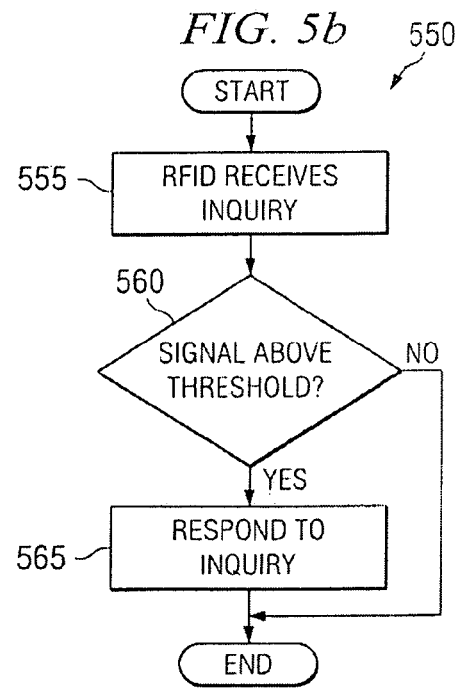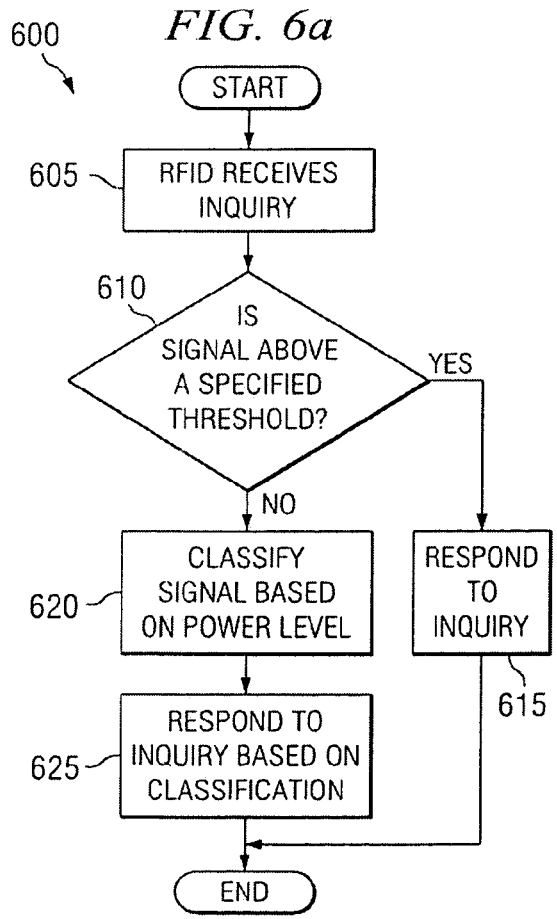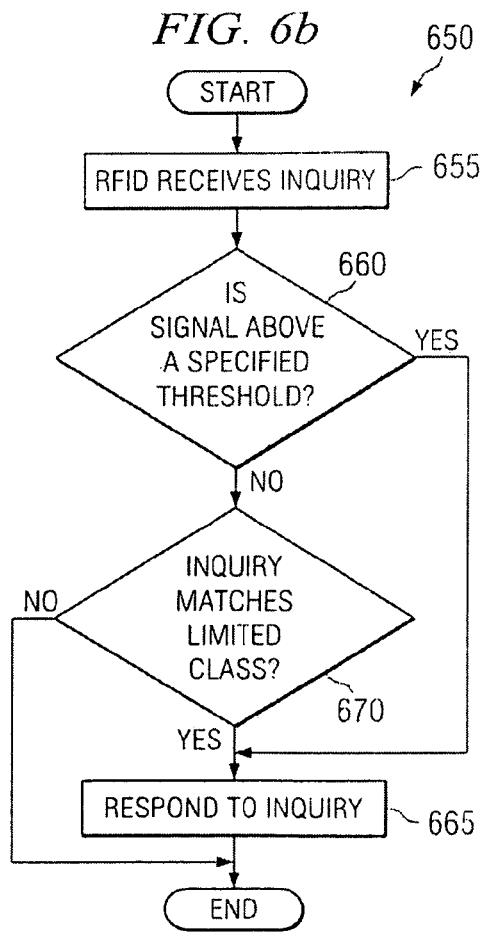

SYSTEM AND METHOD FOR KILLING A RFID TAG

TECHNICAL FIELD

The present invention relates generally to a system and method for wireless communications, and more particularly to a system and method for disabling a RFID tag.

BACKGROUND

The use of radio-frequency identification (RFID) devices in the retail industry has started to become widespread as retailers have realized the potential of these small and inexpensive devices. A RFID tag, which can be placed onto a product offered for sale, can permit the retailer to automatically track movement of the product, perform automatic check-out of the customer (including instant debiting of the customer's account), automatic inventory control, locating misplaced product, and so forth. The use of the RFID devices can also provide the retailers with information regarding the customers, such as their purchasing habits, their movement patterns through the retail store, and so on.

RFID devices that are implanted onto products (commonly referred to as RFID tags) are usually powerless radios (in some applications, the RFID tags can have an external power source, typically, a battery) with a small amount of memory and perhaps a controller or a processor. The RFID tags receive power only when they are energized by RF signals from a RFID reader. A rectifier coupled to an antenna in the RFID tag can convert energy in the RF signals into electrical energy to power the RFID tag. Once powered, the RFID tag can respond to probes from the RFID reader and provide information stored in its memory or execute instructions provided by the RFID reader.

A possible use of RFID tags is to track product sales and potentially associate a product with the person who purchased it. Since each RFID tag can be assigned a unique identification number, not only can the purchaser be associated with a particular product, the purchaser can be uniquely associated with a unique instance of the particular product. For example, the purchaser of a blue shirt can be associated with blue shirt number 17. This unique association can be used by the retailer to curtail problems such as the purchaser purchasing a product and then later buying the same product and returning the previously purchased product. This practice can result in the retailer being forced to accept a return of a used product that cannot be resold and taking a financial loss as a result.

Unfortunately, the RFID tags can also be exploited to infringe the privacy of a customer. For example, if the purchaser of the blue shirt returns to the retailer where the blue shirt was purchased, then RFID readers can retrieve the purchase history of the purchaser using the RFID tag embedded in the blue shirt to direct targeted advertising at the purchaser.

A technique that can be used to help protect the privacy of the customer is to damage (or destroy) the RFID tag after the customer makes a purchase. The damaged RFID tag can no longer provide information since it is inoperable.

Another technique that can be used is to require that a specific sequence of commands be provided to the RFID tag before it would provide unique identifying information to an RFID reader.

One disadvantage of the prior art is that physically destroying the RFID tag at the point of purchase will prevent the retailer from reusing the RFID tag should the customer return the items in an unused, re-sellable state. The retailer would then have to replace the damaged RFID tag with a working one or choose to not be able to take advantage of the functionality of the RFID tag for the returned items.

A second disadvantage of the prior art is that it can be possible to provide the RFID tag with the specific sequence of commands while the customer is in the store and retrieve the unique identifying information. Since the retailer knows the specific sequence of commands needed to retrieve the unique information from the RFID tag, this technique offers very little to no privacy protection for the customer.

SUMMARY OF THE INVENTION

These and other problems are generally solved or circumvented, and technical advantages are generally achieved, by preferred embodiments of the present invention which provides for a system and method for disabling a RFID tag.

In accordance with a preferred embodiment of the present invention, a method for using a radio-frequency identification (RFID) tag is provided. The method comprises attenuating a signal received at an antenna of the RFID tag based upon a status of the RFID tag and responding to an instruction in the received signal if the attenuated signal is detectable.

In accordance with another preferred embodiment of the present invention, a method for using a disabled radio-frequency identification (RFID) tag is provided. The method comprises measuring a signal strength of a signal received at an antenna of the RFID tag, responding to an instruction in the received signal if the signal strength exceeds a specified threshold, and responding to the instruction if the signal strength does not exceed the specified threshold but the instruction meets a specified criterion.

In accordance with another preferred embodiment of the present invention, a radio-frequency identification (RFID) tag is provided. The RFID tag comprises a radio frequency (RF) unit coupled to an antenna, a processor coupled to the RF unit, the processor being configured to respond to instructions carried in the signal, and a memory coupled to the processor, the memory to store data and instructions. The RF unit is configured to perform analog signal processing on a signal provided by the antenna, the RF unit comprising a RF circuitry unit being configured to amplify, detect, and filter the signal, and a signal processor coupled to the RF circuitry unit, the signal processor being configured to manipulate the signal.

An advantage of a preferred embodiment of the present invention is that while a RFID tag can be disabled at the time of purchase, the retailer can still retrieve unique information from the disabled RFID tag in the case that the purchaser returns the product containing the RFID tag.

A further advantage of a preferred embodiment of the present invention is that since the RFID tag is not permanently disabled, the retailer can readily return the RFID tag to full functionality for products that have been returned and are in a re-sellable state.

Yet another advantage of a preferred embodiment of the present invention is that once disabled, the purchaser can feel that his/her private information is protected since the RFID tag in the product will not be providing unique information to RFID readers operating in the environment under normal circumstances.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5a and 5b are diagrams of responses by a RFID tag to the reception of transmissions from a RFID reader, according to a preferred embodiment of the present invention;

FIGS. 6a and 6b are diagrams of responses by a RFID tag to transmissions by an RFID reader, according to a preferred embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely RFID tags and readers in a retail environment. The invention may also be applied, however, to other RFID applications, such as production, inventory control, and so forth.

Figure 1:
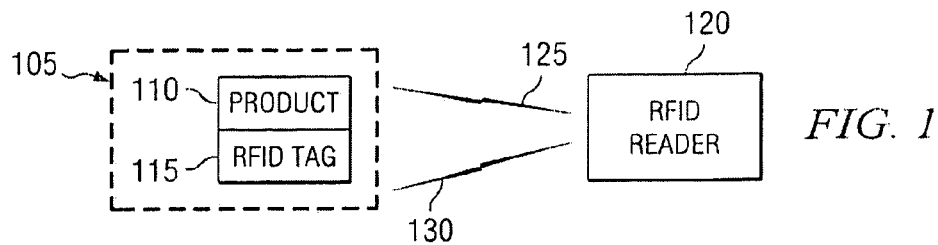
FIG. 1 is a diagram of the operation of a RFID tag and reader combination.

With reference now to FIG. 1, there is shown a diagram illustrating the operation of a RFID tag and reader combination. The diagram shown in FIG. 1 illustrates a retail packaged product 105, which includes a product 110 and a RFID tag 115. The RFID tag 115 may be a part of the packaging of the product 110 or it may be embedded into the product 110 itself. The RFID tag 115, if embedded into the product 110, could be of a sufficiently small size so that the purchaser of the product 110 would most likely not notice the RFID tag 115.

A RFID reader 120 can be used to read information stored in the RFID tag 115 as well as instruct the RFID tag 115 to execute certain instructions and/or programs if the RFID tag 115 is capable of doing so. Since the RFID tag 115 does not have its own power source, the RFID tag 115 must be able to derive needed power from RF signals 125 provided by the RFID reader 120. The RF signals 125 provided by the RFID reader 120 not only contain instructions/commands for the RFID tag 115, but can also be used by the RFID tag 115 to derive necessary power. After being powered, the RFID tag 115 can respond to instructions/commands from the RFID reader 120 and provide a response back to the RFID reader 120, also in the form of RF signals 130.

Since it is possible for an RFID tag to contain unique identification information, privacy concerns have been raised due to the fact that it can be possible to associate a purchaser's personal information, including purchase and financial history, with a particular item purchased (such as a garment) and then when the purchaser returns to the store wearing the garment, the retailer can detect the return of the purchaser and can target specific advertisement at the purchaser. However, the use of the RFID tags can enable the retailer to keep accurate track of inventory as well as physical location of merchandise. Therefore, a compromise needs to be made regarding the functionality of the RFID tag.

Figure 2A:
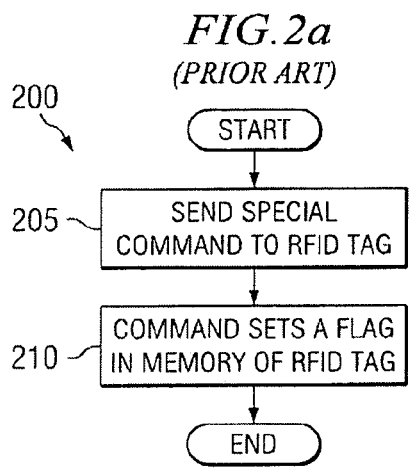
FIGS. 2a and 2b are diagrams of prior art techniques for disabling a RFID tag.
Figure 2B:
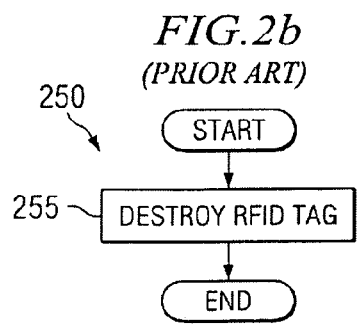

With reference now to FIGS. 2a and 2b, there are shown flow diagrams illustrating two prior art techniques for disabling a RFID tag to help protect the privacy of the customer. One way to help protect the privacy of a customer who has just purchased a product with a RFID tag embedded into it is to disable the RFID tag after the purchase is complete. The flow diagrams illustrated in FIGS. 2a and 2b illustrate two different techniques for disabling the RFID tag.

The flow diagram shown in FIG. 2a illustrates a software-based technique 200 for disabling the RFID tag. After the product containing the RFID tag has been purchased, a special command can be issued to the RFID tag (block 205). The execution of the command by the RFID tag can result in the setting of a specified memory location to a specific value (block 210). Once the specific memory location contains the specific value, the RFID tag will not respond to general instructions and commands from a RFID reader. This effectively disables the RFID tag. However, depending upon the RFID tag's programming, it may be possible to get the RFID tag to respond if it is provided with a specific sequence of commands/instructions. This technique allows the retailer to reactivate a RFID tag for a product that has been returned prior to being re-sold. Unfortunately, since the retailer knows the specific sequence of commands/instructions needed to obtain information from the RFID tag, this technique can still compromise the privacy of the customer.

The flow diagram shown in FIG. 2b illustrates a technique 250 for disabling the RFID tag that is a permanent solution. After the product containing the RFID tag has been purchased, the RFID tag can be physically destroyed (block 255). The RFID tag can be destroyed by a mechanical technique that physically damages the RFID tag or the RFID tag can be damaged by sending RF signals at a power level that is beyond the power handling capabilities of the RFID tag, thus damaging the RFID tag electronically. Since the RFID tag has been physically destroyed, it is not possible for a retailer to reactivate the RFID tag should the customer return to the retailer's business. However, since the RFID tag has been destroyed, should the customer return the product, the retailer must decide whether to insert a new RFID tag in the product or return the product to the sales floor without an operational RFID tag.

Figure 3:
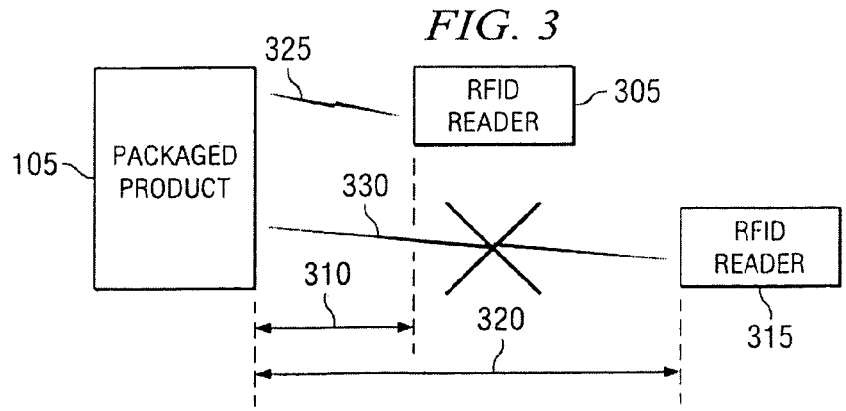
FIG. 3 is a diagram of a distance-based technique for disabling a RFID tag, according to a preferred embodiment of the present invention.

With reference now to FIG. 3, there is shown a diagram illustrating a distance-based technique for disabling a RFID tag, according to a preferred embodiment of the present invention. In a typical retail situation that makes use of RFID readers to track inventory and to target advertisement towards customers, the entire store would be covered by a plurality of RFID readers that can read information from RFID tags located on products as they are moved through the store. In this situation, it is normal for a RFID tag to be separated from a RFID reader by a significant distance, on the order of many feet. While in a situation wherein a customer is buying or returning a product, the typical separation between a RFID tag and a RFID reader may be on the order of a few inches. This significant difference in separation between a RFID tag and RFID reader in the two situations can be exploited to provide a measure of privacy for customers who are carrying products with embedded RFID tags that have not been deactivated.

The diagram shown in FIG. 3 illustrates the packaged product 105, containing a RFID tag (not shown), separated from a first RFID reader 305 by a small distance (shown as span 310) and a second RFID reader 315 by a large distance (shown as span 320). Given that the RFID readers transmit signals at about the same power level, the packaged product 105 will detect a significantly stronger signal from the first RFID reader 305 than the second RFID reader 315. This is due to the larger separation between the RFID tag 105 and the second RFID reader 315. According to a preferred embodiment of the present invention, the strength of the signal received by the RFID tag 105 can be used to enable a response from the RFID tag 105.

In a situation when a customer is shopping in a store, the separation between the customer and RFID readers located throughout the store will typically be large. Therefore, transmissions received by RFID tags located on the person of the customer will have relatively small signal strengths. However, when the customer is making a purchase or a return, the products being purchased or returned will be in close proximity to RFID readers and will therefore receive transmissions at much higher signal strengths.

According to a preferred embodiment of the present invention, a disabled RFID tag can be configured so that it will respond only to transmissions from RFID readers (such as the first RFID reader 305) with very high signal strengths, such as when the disabled RFID tag is adjacent to a RFID reader. This is shown in FIG. 3 as arrow 325. However, when the disabled RFID tag receives transmissions from RFID readers (such as the second RFID reader 315) with low signal strengths, then the disabled RFID tag will ignore the transmissions (shown as arrow 330 in FIG. 3).

Figure 4:
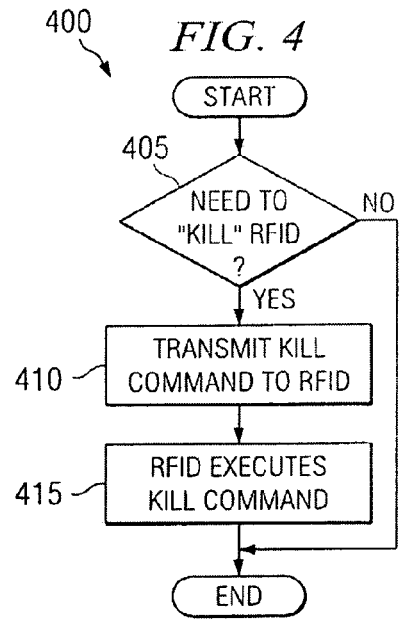
FIG. 4 is a diagram of a sequence of events in disabling a RFID tag, according to a preferred embodiment of the present invention.

With reference now to FIG. 4, there is shown a diagram illustrating a sequence of events 400 in the disabling of a RFID tag, according to a preferred embodiment of the present invention. A RFID tag may be disabled after a customer has purchased a product containing the RFID tag. The disabling of the RFID tag can prevent the retailer from obtaining unique identifying information from the RFID tag located in the product and associating it with personal and financial information about the customer and then making use of this information each time the customer returns to the store along with the purchased product. For example, if the customer purchases a shirt containing a RFID tag, each time the customer returns to the store wearing the shirt, the retailer can retrieve unique identification information from the RFID tag in the shirt. This information can permit the retailer to target advertisement at the customer.

The RFID tag can be disabled (killed) at the time of purchase to help protect the privacy of the customer. First, a need to determine if the RFID tag needs to be disabled is determined (block 405). A RFID tag may need to be disabled when a customer purchases a product containing the RFID tag, when the customer returns a product and the retailer exchanges a new product containing the RFID tag for the returned product, and so forth. Note that the RFID tag can be used as a security device for the retailer to help prevent theft as well as provide location information. Therefore, the retailer does not want to indiscriminately disable RFID tags. If the RFID tag is to be disabled (block 405), then a RFID reader can be used to transmit a disable (kill) command to the RFID tag (block 410). Note that while the disable command is referred to as a single command, an actual implementation may require a series of commands or a specified sequence of values to be provided to the RFID tag to disable the RFID tag. This can be used to help reduce inadvertent disabling of RFID tags as well as preventing unauthorized disabling of RFID tags. After receiving the disable command from the RFID reader, the RFID tag executes the disable command (block 415). The execution of the disable command can result in the setting of a specified memory location to a specified value. Preferably, the memory location can be made from an erasable form of memory so that a different value can be written to the specified memory location to un-disable the RFID tag. Alternatively, a fuse-like object in the RFID tag can be blown.

If the execution of the disable command resulted in the change of a value stored in a specified memory location, then it can be possible to reverse the disabling of the RFID tag. The reversal of the disabling of the RFID tag can be accomplished by the execution of an enable command, for example. Once again, while the discussion refers to an enable command in a singular sense, an actual implementation of the enable command may require a plurality of commands and/or control sequences. To help protect the privacy of a customer who has purchased the product containing a disabled RFID tag, the execution of the enable command may require special authentication procedures and/or specific authorization before the execution can take place. For example, the RFID reader that can be used to enable the disabled RFID tag may need to be a special enhanced RFID reader wherein only authorized persons can make use of the device. Additional requirements may be to require that the RFID reader be held in close proximity with the RFID tag for an extended period of time to help ensure that the RFID tag not be enabled by a casual rendezvous with the RFID reader.

With reference now to FIGS. 5a and 5b, there are shown flow diagrams illustrating responses by a RFID tag to the reception of transmissions from a RFID reader, according to a preferred embodiment of the present invention. One way to implement the distance based disabling of a RFID tag is use either a hardware or software technique to ignore received transmissions that are below a certain signal strength. The signal strength threshold can be an indicator that the RFID tag is within a certain distance from the RFID reader.

A hardware technique can make use of an attenuator in the signal path that attenuates the received signal by a specified amount. Therefore the attenuator will further reduce the received signal's signal strength, making a received signal with a signal strength below a desired threshold undetectable by hardware in the RFID tag. For example, a 25 dB attenuator can reduce a received signal with a signal strength of 0 dBm to approximately −25 dBm, which may be below a detectable threshold, while a received signal with a signal strength of +15 dBm will be reduced to −10 dBm, which may be above the detectable threshold. Note that the signal strength and attenuator values are simply exemplary values and may not be based upon any actual RFID system. Similarly, a software based technique may attenuate the received signal using shifts and/or divisions of a digitized version of the received signal to simulate a reduction in the magnitude of the received signal.

Furthermore, in addition to the attenuation techniques discussed above, a signal strength threshold can also be established by monitoring a voltage out of a rectifier (used to provide power to the RFID tag), a current through a limiter placed at the output of the rectifier, and so on. Also, methods using combinations of the above discussed techniques may be used.

Hence, using a simple attenuation of the received signal to implement the disabling of the RFID tag, a response 500 by the RFID tag to the reception of a transmission can be: if the RFID tag receives a transmission (block 505), which implies that the transmission has adequate signal strength, then the RFID tag responds to the transmission (block 510). As discussed previously, transmissions with inadequate signal strength after being attenuated, are below detectable threshold of hardware in the RFID tag.

A more software oriented approach can involve the comparison of the received signal's signal strength with a specified threshold and then enabling (or disabling) a response from the RFID tag based upon the comparison. A response 550 by the RFID tag to the reception of a transmission can be as follows: the RFID tag receives a transmission (block 555) and compares the signal strength of the transmission with a specified threshold (block 560). If the signal strength exceeds the specified threshold, then the RFID tag can be enabled to respond to the transmission (block 565). For example, using the signal strength values discussed above, the RFID tag receiving a transmission with a signal strength of more than +15 dBm can result in a response while a transmission with a lower signal strength will result in no response and can appear as if the RFID tag is disabled.

With reference now to FIGS. 6a and 6b, there are shown flow diagrams illustrating responses by a RFID tag to transmissions by an RFID reader, according to a preferred embodiment of the present invention. In addition to simply attenuating the received signal by a fixed amount or comparing the signal strength against a specified threshold, it can be possible to have the disabled RFID tag respond differently to received signals at different signal strengths (FIG. 6a) and different specific inquiries (FIG. 6b).

The diagram shown in FIG. 6a illustrates a response 600 of a RFID tag to a transmission from a RFID reader, wherein the RFID tag can respond differently based upon the signal strength of the transmission. After the RFID tag receives the transmission from the RFID reader (block 605), the RFID tag can check to determine if the signal strength of the transmission is above a specified threshold (block 610). According to a preferred embodiment of the present invention, if the signal strength is above the specified threshold, then the RFID tag shall respond fully to any and all requests from the RFID reader (block 615).

However, if the signal strength of the transmission is less than the specified threshold, then the RFID tag can classify the transmission based upon the signal strength of the transmission (block 620). By classifying the signal strength, the RFID tag can determine the relative proximity of the RFID reader to the RFID tag, and based on the classification, the RFID tag can enable (or disable) the execution of certain types (or classes) of transmissions (block 625). For example, the RFID tag can permit the execution of instructions from a transmission that can change the operating mode of the RFID tag only if the transmission has been classified a certain way. Additionally, if the transmission has been classified at a low level, then the RFID tag may only permit the execution of instructions from such a transmission if the instruction requests non-unique identification information, for example.

The diagram shown in FIG. 6b illustrates a response 650 of a RFID tag to a transmission from a RFID reader, wherein the RFID tag can respond to a specified class of inquiries if the signal strength of the transmission is below a specified threshold. After the RFID tag receives the transmission from the RFID reader (block 655), the RFID tag can check to determine if the signal strength of the transmission is above a specified threshold (block 660). According to a preferred embodiment of the present invention, if the signal strength is above a specified threshold, then the RFID tag shall respond fully to any request from the RFID reader (block 665).

However, if the signal strength of the transmission is less than the specified threshold, then the RFID tag will check to determine if a request in the transmission matches that which belongs to a special class of requests (block 670). If the request belongs to the special class, then the RFID tag will respond to the transmission (block 665), else the RFID tag can ignore the transmission. The use of the special class when the RFID tag is not in close proximity to the RFID reader can permit the RFID tag to provide certain types of information, such as non-unique identification information, to the RFID reader.

Figure 7A:
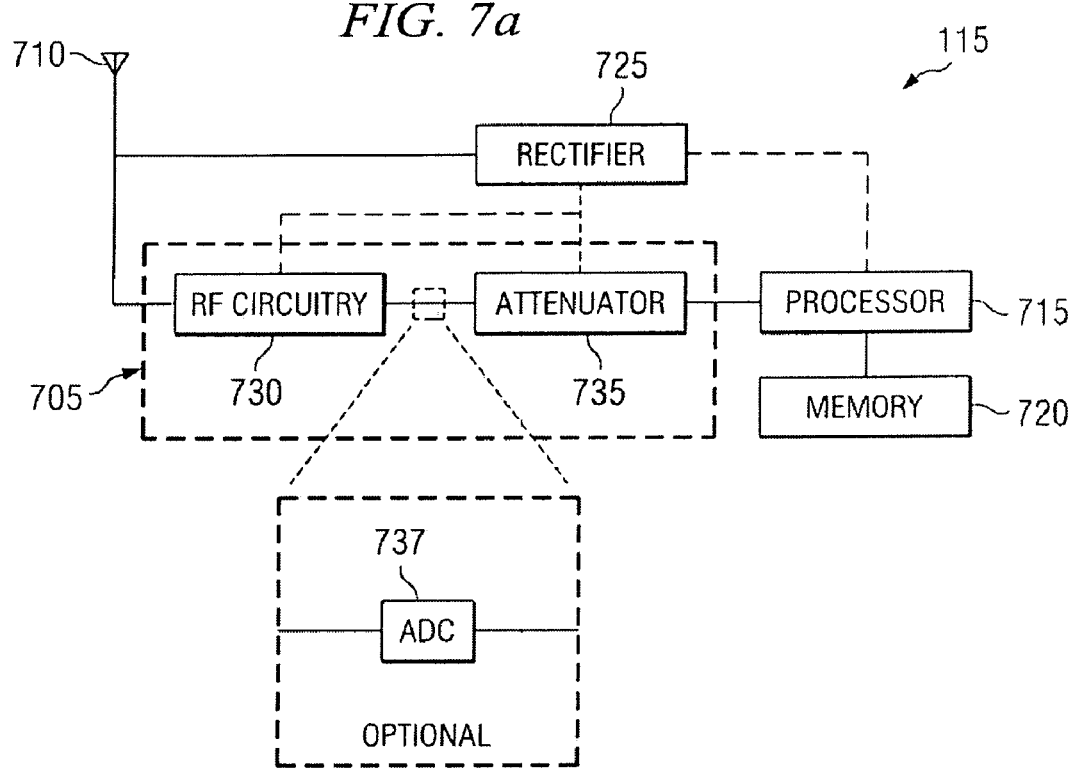
FIGS. 7a and 7b are diagrams of a RFID tag and a close-up view of a RF unit, according to a preferred embodiment of the present invention.

With reference now to FIG. 7a, there is shown a diagram illustrating a block-level view of a RFID tag 115, according to a preferred embodiment of the present invention. The RFID tag 115 includes a RF unit 705, which is coupled to an antenna 710. The RF unit 705 is also coupled to a processor 715 that is responsible for executing inquiries, commands, and so forth, that are provided to the RFID tag 115 from a RFID reader or that are already stored in the RFID tag 115. The RFID tag 115 can store programs, control data, user data, and so on, in a memory 720 that is coupled to the processor 715. As discussed previously, the RFID tag 115 does not have its own power source and actually derives the power that it needs to operate from the RF signal received at its antenna 710. A rectifier 725, coupled to the antenna 710, can perform the conversion of the RF signal received at the antenna 710 into power that can be used by the RF unit 705, processor 715, and memory 720. The rectifier 725 is needed in RFID tags that do not have a power supply. However, for those RFID tags that have a power supply, the rectifier 725 may not be necessary. Note that FIG. 7a displays the power connections between the rectifier 725 and the RF unit 705, processor 715, and the memory 720 (indirectly through the processor 715) as dashed lines.

Internal to the RF unit 705 is RF circuitry unit 730 that is responsible for functions such as analog signal processing of RF signals received at the antenna 710. Examples of analog signal processing can include filtering, mixing, amplification, and so forth. The RF circuitry unit 730 is coupled to an attenuator 735. As discussed previously, the attenuator 735 can cause a drop in the signal strength of the signal produced by the RF circuitry unit 730 to help ensure that RF signals received by the RFID tag 115 are only detectable if the RFID tag 115 is in close proximity to the RFID reader. According to a preferred embodiment of the present invention, the attenuator 735 can be switchable based upon a value stored in a specific memory location. The specific memory location can be an indicator of the state of the RFID tag 115, either enabled or disabled. For example, if the RFID tag 115 is enabled, then the attenuator 735 is switched off and the RF signal is not attenuated. The specific memory location can be a part of the attenuator 735 or it may be located in the memory 720. If the specific memory location is part of the memory 720, then a connection between the memory 720 and the attenuator 735 exists but is not shown in FIG. 7a. The attenuator 735 may be an analog attenuator wherein it simply attenuates an analog signal provided at its input by a specified amount.

As discussed previously, the attenuator 735 may also be digital in nature, wherein a digital representation of the output of the RF circuitry unit 730 is provided to the attenuator 735, perhaps provided by an optional analog-to-digital converter (DAC) 737, and attenuates the digital representation of the output of the RF circuitry unit 730 by shifting the digital values by a specified number of bits. For example, a digital value representing a portion of the output of the RF circuitry unit 730 can be attenuated by a factor of eight if it is shifted by three bits to the right with the bits that are shifted out of the value being discarded, i.e., a non-circular right shift.

Figure 7B:
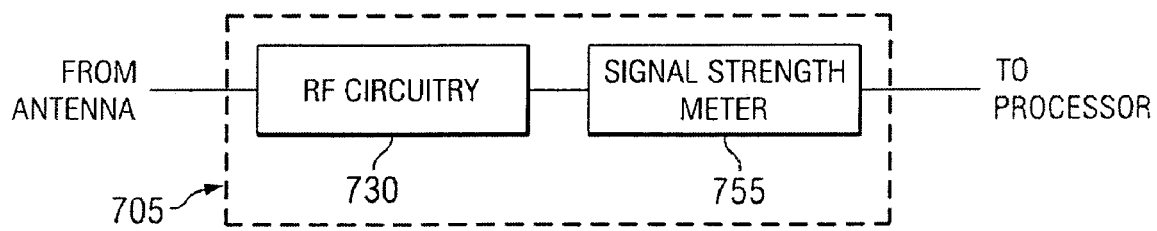

With reference now to FIG. 7b, there is shown a diagram illustrating a detailed view of the RF unit 705, wherein the RF unit 705 provides a signal strength measurement, according to a preferred embodiment of the present invention. Rather than simply attenuating the RF signal, some of the techniques discussed above make use of a measure of the signal strength of the RF signal to determine the response of the RFID tag 115 to inquiries provided by the RFID reader. In such a situation, the RF unit 705 can have a signal strength meter 755 rather than the attenuator 735 coupled to the RF circuitry unit 730. The signal strength meter 755 can provide a measure of the signal strength of the RF signal and can provide the signal strength measurement to the processor 715. The processor 715 can then determine the response of the RFID tag 115 to the inquiry from the RFID reader using the signal strength measurement (reference FIGS. 6a and 6b).

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for using a radio-frequency identification (RFID) tag, the method comprising:
    attenuating a signal received at an antenna of the RFID tag in receiver circuitry of the RFID tag based upon a status of the RFID tag; and
    responding to an instruction in the received signal if the attenuated signal is detectable.

2. The method of claim 1, wherein the attenuating is performed on an analog signal, wherein an attenuator attenuates the analog signal by a specified amount, and wherein the specified amount is a non-zero amount if the status is disabled.

3. The method of claim 2, wherein the attenuation by the specified amount ensures that only received signals transmitted at a power level from a transmitter less than a specified distance away from the antenna of the RFID tag is detectable.

4. The method of claim 1, wherein the attenuation is performed on a digital signal, and the method further comprising digitizing the signal received signal prior to the attenuating.

5. The method of claim 4, wherein the attenuating comprises shifting the digitized received signal by a specified number of bits, and wherein the specified number of bits is non-zero if the status is disabled.

6. The method of claim 1, wherein the attenuating is substantially equal to zero if the status is not disabled.

7. The method of claim 6, wherein a memory location stores a value indicating the status of the RFID tag.

8. A method for using a disabled radio-frequency identification (RFID) tag, the method comprising:
    providing an RFID tag disabled by attenuating a received signal;
    measuring a signal strength of a the received signal in receiver circuitry of the RFID tag;
    responding to an instruction in the received signal if the signal strength exceeds a specified threshold; and
    responding to the instruction if the signal strength does not exceed the specified threshold but the instruction meets a specified criterion.

9. The method of claim 8, wherein the specified criteria is a class of instructions that do not require the RFID tag to provide unique identifying information.

10. The method of claim 9, wherein the specified criterion further does not require the RFID tag to modify internally stored values.

11. The method of claim 8 further comprising classifying the received signal based on the signal strength.

12. The method of claim 11, wherein the specified criterion differs based upon the classification of the received signal.

13. A radio-frequency identification (RFID) tag comprising:
    a radio frequency (RF) unit coupled to an antenna, the RF unit is configured to perform analog signal processing on a signal provided by the antenna, the RF unit comprising
    a RF circuitry unit configured to amplify, detect and filter the signal;
    a signal processor coupled to the RF circuitry unit, the signal processor is configured to manipulate the signal;
    a processor coupled to the RF unit, the processor is configured to respond to instructions carried in the signal; and a memory coupled to the processor, the memory to store data and instructions wherein the operation of the signal processor is controlled by a value stored in a memory location the value stored in the memory location indicates if the RFID tag is disabled, and wherein if the RFID tag is not disabled, then the signal processor does not attenuate the received signal.

14. The RFID tag of claim 13 further comprising a rectifier coupled to the antenna, the rectifier is configured to derive power for the RFID tag from the signal provided by the antenna.

15. The RFID tag of claim 13, wherein the signal processor is an analog signal attenuator.

16. The RFID tag of claim 13, wherein the signal processor operates on a digital representation of the signal, and wherein the digitized signal is shifted by a specified number of bits.

17. The RED tag of claim 16, wherein the RF unit further comprises an analog-to-digital converter (ADC) coupled in between the RF circuitry unit and the signal processor, the ADC is configured to provide a digital representation of an analog signal.

18. The RFID tag of claim 13, wherein the signal processor is a signal strength meter that is configured to provide a measure of the signal strength of the signal.

19. The RFID tag of claim 18, wherein the processor makes use of the measure of the signal strength to determine if it will respond to instructions carried in the signal.

* * * * *